(12) United States Patent
Fry

(10) Patent No.: US 7,800,621 B2
(45) Date of Patent: Sep. 21, 2010

(54) APPARATUS AND METHODS FOR CONTROL OF A MEMORY CONTROLLER

(75) Inventor: James Fry, Aurora (CA)

(73) Assignee: ATI Technologies Inc., Markham, Ontario (CA)

( * ) Notice: Subject to any disclaimer, the term of this patent is extended or adjusted under 35 U.S.C. 154(b) by 558 days.

(21) Appl. No.: 11/130,366

(22) Filed: May 16, 2005

(65) Prior Publication Data

US 2006/0259804 A1 Nov. 16, 2006

(51) Int. Cl.
*G09G 5/39* (2006.01)
(52) U.S. Cl. .................. 345/531; 345/520; 345/534; 711/167; 713/322; 713/323; 713/324
(58) Field of Classification Search ............... 345/211, 345/213, 531, 544, 558, 560, 520, 534; 365/189.01–189.12; 348/714; 713/320, 323, 713/324, 322; 711/167
See application file for complete search history.

(56) References Cited

U.S. PATENT DOCUMENTS

| | | | |
|---|---|---|---|
| 4,229,797 A | 10/1980 | Ledley | |
| 4,412,294 A | 10/1983 | Watts et al. | |
| 4,747,074 A | 5/1988 | Yoshida | |
| 4,860,251 A | 8/1989 | Bizjak et al. | |
| 5,398,048 A | 3/1995 | O'Mahony | |
| 5,544,101 A | 8/1996 | Houston | |
| 5,615,355 A * | 3/1997 | Wagner | 711/167 |
| 5,615,376 A * | 3/1997 | Ranganathan | 713/322 |
| 5,675,808 A | 10/1997 | Gulick et al. | |
| 5,729,720 A | 3/1998 | Kau et al. | |
| 5,752,045 A | 5/1998 | Chen | |
| 5,781,496 A | 7/1998 | Pinkham et al. | |
| 5,781,768 A | 7/1998 | Jones, Jr. | |
| 5,804,749 A | 9/1998 | Shirakawa et al. | |
| 5,835,435 A | 11/1998 | Bogin et al. | |
| 5,907,330 A | 5/1999 | Simmers | |
| 6,002,412 A | 12/1999 | Schinnerer | |

(Continued)

FOREIGN PATENT DOCUMENTS

EP 0 155 499 9/1985

OTHER PUBLICATIONS

Jedec Solid State Technology Association; Jedec Standard; DDR2 SDRAM Specification; Jan. 2004; Jedec Solid State Technology Association; Arlington, VA.

*Primary Examiner*—Kimbinh T Nguyen
(74) *Attorney, Agent, or Firm*—Vedder Price P.C.

(57) ABSTRACT

Apparatus and methods are disclosed for controlling the memory controller and, in particular, controlling signaling of the memory controller to a memory via memory interface during a static screen condition. An apparatus includes static image detection logic that is configured to detect when image data being displayed by a display controller is static and to communication detection of static image data to the display controller. The apparatus also includes control logic within the display controller responsive to the static image detection logic, where the control logic is configured to detect a level of a line buffer within the display controller and to send a signal to a memory controller directing the memory controller to issue a signal to a memory to enter a self-refresh mode, thereby turning off at least one memory clocking circuit within the memory controller. A corresponding method is also disclosed.

15 Claims, 3 Drawing Sheets

U.S. PATENT DOCUMENTS

| | | |
|---|---|---|
| 6,014,125 A | 1/2000 | Herbert |
| 6,023,262 A | 2/2000 | Eglit |
| 6,040,845 A | 3/2000 | Melo et al. |
| 6,046,738 A | 4/2000 | Eglit et al. |
| 6,067,071 A | 5/2000 | Kotha et al. |
| 6,067,083 A | 5/2000 | Glen et al. |
| 6,073,223 A | 6/2000 | McAllister et al. |
| 6,079,022 A | 6/2000 | Young |
| 6,079,025 A | 6/2000 | Fung |
| 6,112,310 A | 8/2000 | Jun et al. |
| 6,130,660 A | 10/2000 | Imsand |
| 6,151,681 A | 11/2000 | Roden et al. |
| 6,177,946 B1 | 1/2001 | Sinclair et al. |
| 6,209,075 B1 | 3/2001 | Lau |
| 6,232,955 B1 | 5/2001 | Guttag et al. |
| 6,263,448 B1 | 7/2001 | Tsern et al. |
| 6,292,201 B1 | 9/2001 | Chen et al. |
| 6,307,281 B1 | 10/2001 | Houston |
| 6,460,125 B2 | 10/2002 | Lee et al. |
| 6,657,634 B1 * | 12/2003 | Sinclair et al. .............. 345/534 |
| 6,820,209 B1 | 11/2004 | Culbert et al. |
| 6,836,848 B2 | 12/2004 | Yu et al. |
| 6,943,844 B2 | 9/2005 | Cahill, III |
| 6,950,105 B2 | 9/2005 | Giemborek et al. |
| 7,000,065 B2 | 2/2006 | Wilcox et al. |
| 7,007,175 B2 | 2/2006 | Chang et al. |
| 7,028,200 B2 | 4/2006 | Ma |
| 7,036,032 B2 | 4/2006 | Mizuyabu et al. |
| 7,073,082 B2 | 7/2006 | Hsu |
| 7,093,153 B1 | 8/2006 | Witek et al. |
| 7,114,086 B2 | 9/2006 | Mizuyabu et al. |
| 7,315,957 B1 | 1/2008 | Wagner et al. |
| 2001/0012230 A1 | 8/2001 | Takemae et al. |
| 2003/0128198 A1 | 7/2003 | Mizuyabu et al. |
| 2003/0210247 A1 | 11/2003 | Cui et al. |
| 2004/0039954 A1 | 2/2004 | White et al. |
| 2004/0073824 A1 * | 4/2004 | Machida .................... 713/323 |
| 2004/0139359 A1 | 7/2004 | Samson et al. |
| 2004/0236896 A1 | 11/2004 | Kanapathippillai et al. |
| 2004/0243858 A1 | 12/2004 | Dennis et al. |
| 2005/0195181 A1 | 9/2005 | Khodorkovsky |
| 2005/0289369 A1 | 12/2005 | Chung et al. |
| 2005/0289377 A1 | 12/2005 | Luong et al. |
| 2006/0020835 A1 | 1/2006 | Samson et al. |
| 2006/0026450 A1 | 2/2006 | Bounitch |
| 2006/0031690 A1 | 2/2006 | Chung et al. |
| 2006/0187226 A1 * | 8/2006 | Bruno et al. ................ 345/534 |

\* cited by examiner

APPARATUS AND METHODS FOR CONTROL OF A MEMORY CONTROLLER

TECHNICAL FIELD

The present application relates to apparatus and methods for control of a memory controller and, more particularly, for controlling a memory controller when a static screen condition of display data is detected.

BACKGROUND

In mobile electronic devices, namely devices such as laptop computers having a limited power supply (e.g., battery-powered), personal data assistants (PDAs) and cell phones, reducing the power consumption of such devices is important in order to extend the amount of time the devices may be operated on a limited amount of energy. Typically, these types of devices include a display screen for displaying image data. In some particular applications run on these devices, the applications generating image data, the image data displayed is static; that is, the same image is constantly displayed. Examples of such applications may include Windows® desktop for a computer or applications such as word processing programs, e-mail programs, and other similar applications where the displayed image data may often times be constant or static.

During display of the static data discussed above, no processing of image data is performed by processing devices, such as a central processing unit or a graphic processing unit, and, consequently, no image data is written to memory locations storing the display image data. Nonetheless, in computing systems, such as the devices enumerated above, display image data is typically read by a display controller from the memory locations under the direction of a memory controller controlling read and write accesses of the memory locations. That is, the display controller is a real time client in that the image data is continuously fetched from memory for displaying images on a display medium. In particular, the image data is typically fetched from the memory in advance of display and temporarily buffered or stored in a line buffer contained within the display controller prior to display in order to ensure the data will be displayed on time. The line buffer is configured to store a number of entries or lines of image data.

Although display image data may be static, because the memory controller continues to access memory at the request of the display controller, power consumption is still relatively high, despite the lack of processing of data and memory writes. In light of the amounts of power consumed during display of static screen images, it is known in the art to employ various schemes in order to attempt to reduce the power consumption when static images are being displayed on a screen, taking advantage of the constancy of the data in memory. Such schemes include, for example, lowering the clock frequency of the processor (i.e., the memory client) during periods of a static condition of image data stored in the memory. Another approach includes lowering the core power rail voltage (i.e., the voltage of the processor or memory client). Further schemes known in the art include dynamic clock branches in the memory controller, which involves shutting off different clocking branches to reduce the amount of switching or clock gating, thereby lowering power. In particular, CMOS circuits, whose power consumption is directly proportional to the amount of switching, are typically utilized in memory controllers and, thus, reducing the amount of switching of these CMOS circuits helps to reduce the power consumption.

Moreover, in particular memories, such as double data rate (DDR) synchronous dynamic RAM memories (DDR SDRAM), industry standards governing the construction of such devices provide power saving functionalities within the memory devices. In particular, the JEDEC Solid State Technology Association has developed specifications such as the DDR2 SDRAM specification (JESD 79-2A, January 2004) providing at least three different functionalities for power reduction. These three functionalities are active power down, pre-charged power down, and self-refresh. The active power down operation, in particular, affects a lower power state for the memory device while pages are open and being accessed from banks within the memory device. The pre-charge power down operation affects a low power state of the memory when particular pages are closed. Particularly in instances where image data is static, pre-charge power down operation has typically been used to reduce power consumption. Although the active power down and pre-charge power down operations provided by the JEDEC standard serve to reduce power, these modes of operation still require that a memory controller drive clock signals to the memory device, the signals communicated over the memory interface. Since these clock signals are typically implemented with CMOS circuitry, the switching required to drive the clock signals consumes high amounts of power.

The third power saving operation provided by the JEDEC standard mentioned above is self-refresh operation. In this mode, the memory device itself serves to refresh the dynamic RAM circuits within the memory device. When a memory device is in this mode, the memory controller no longer needs to drive clock signals to the memory. A disadvantage with self-refresh mode, however, is the high latency when bringing the memory device out of the self-refresh mode. Thus, this mode is typically not used to save power when the display device is active, especially for memories used to store image data to be displayed by a display controller because of the high latency to bring back the memory out of self-refresh.

DETAILED DESCRIPTION OF THE PRESENT EMBODIMENTS

The present disclosure relates to apparatus and methods for controlling the memory controller and, in particular, controlling signaling of the memory controller to a memory via a memory interface during a static screen condition. The apparatus includes static image detection logic that is configured to detect when image data being displayed by a display controller is static and to communicate detection of static image data to the display controller. The apparatus also includes control logic within the display controller responsive to the static image detection logic, where the control logic is configured to detect a level of a line buffer within the display controller and to send a signal to a memory controller directing the memory controller to issue a signal to a memory to enter a self-refresh mode, thereby turning off at least one memory clocking circuit within the memory controller.

The present disclosure also discloses a method for controlling the memory controller that includes detecting when displayed image data stored in the memory is static. The method also includes communicating detection of the static image data condition to a display controller that displays the image data stored in the memory. Furthermore, the method includes detecting the level of a line buffer in the display controller and sending a signal to a memory controller directing the memory controller to issue a signal to the memory to enter a self-refresh mode, thereby turning off at least one memory clocking circuit within the memory controller.

The disclosed methods and apparatus, by actively signaling the memory controller to place a memory device in self-refresh mode after detection of a static screen condition, afford further power reduction for a computing system, over merely placing the memory in a pre-charge power down condition because the clocking circuit within the memory controller can be disabled during a self-refresh mode. The use of self-refresh mode is possible during static screen conditions because only a small portion of available memory bandwidth is being utilized during such conditions and the display controller is tolerant to the higher latency for memory requests resultant from the memory device being put into self-refresh mode. This is not the case during normal modes of operation, such as when a game is being played or a benchmark is running, because the exit latency of self-refresh modes of the memory would cause significant and intolerable drops in performance. Accordingly, the disclosed methods and apparatus, by including static screen detection logic, are able to affect self-refresh only during static screen conditions.

Figure 1:
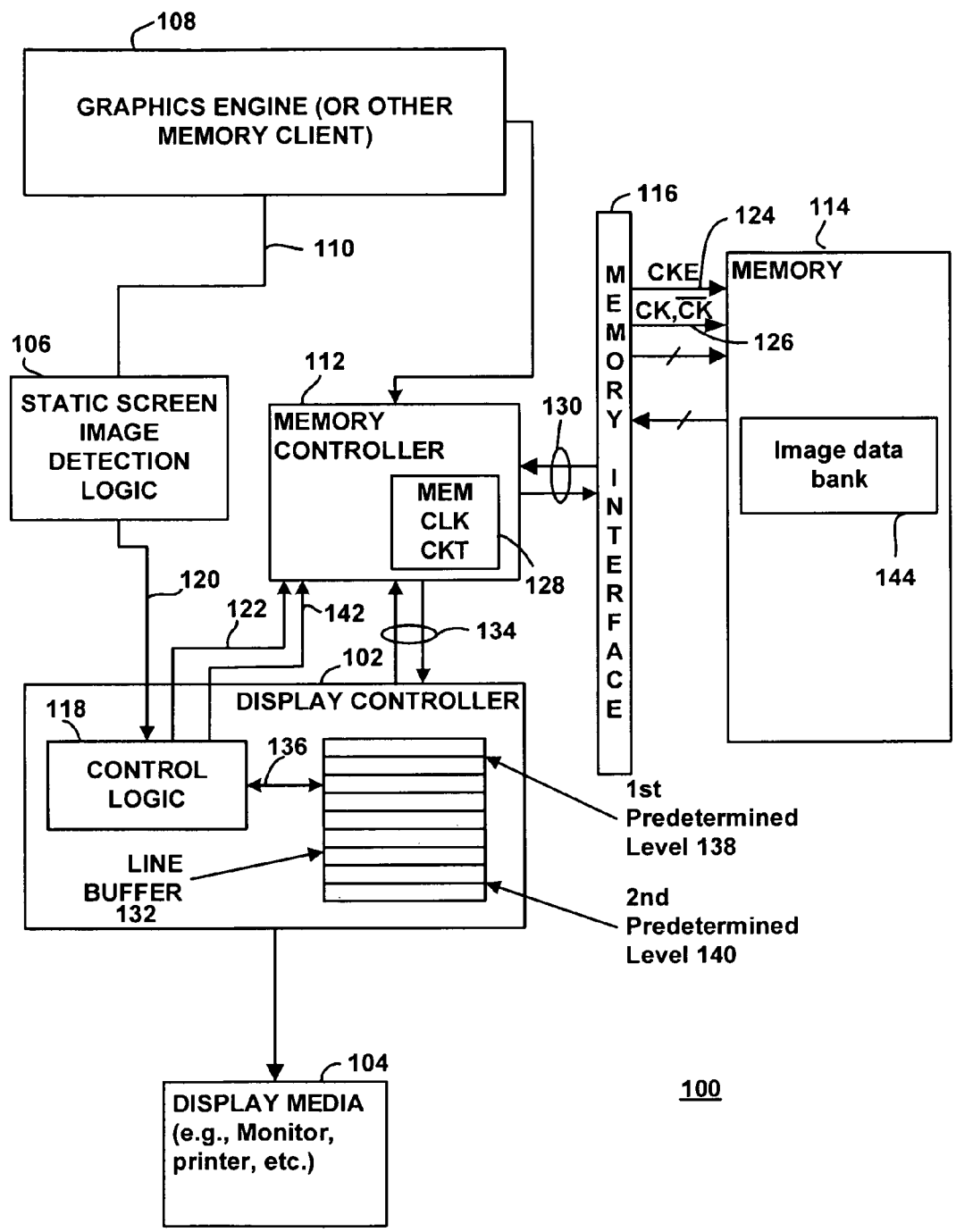
FIG. 1 illustrates a block diagram of an apparatus for controlling a memory controller according to an example of the present disclosure.

FIG. 1 illustrates an apparatus for controlling a memory controller and, in particular, a memory controller for controlling access to a memory pad includes image data to be displayed by a display controller 102 on to a display media 104. The apparatus 100 includes static image detection logic 106 that is configured to detect when image data being displayed by the display controller 102 is static; i.e., the image data is unchanging for a particular period of time. The static image detection logic 106 may, as an example, detect the static image condition by looking at whether a graphics engine 108, for example, is in an idle condition where new or changed image data is not being produced by a connection 110. Alternatively, logic 106 may poll a memory controller 112, which controls read and write accesses to a memory 114 by a memory interface 116 receives no memory access requests from the graphics engine 108 or other memory clients. Additional ways of determining a static image or static screen mode will be discussed later.

Apparatus 100 also includes control logic 118 that is responsive to detection of static image data as communicated by logic 106 to control logic 118 via an interconnection 120. Although the control logic 118 is shown in FIG. 1 as part of the display controller 102, the control logic 118 may, alternatively, be a separate hardware item associated with the display controller. It is also noted that static image detection logic 106 and control logic 118 are shown and described as implemented as hardware, such as a state engine or any other suitable device that may implement logic. Furthermore, logic 106 and 118 could, alternatively, be implemented as a combination of hardware and software.

After a static screen image condition has been detected by logic 106, control logic 118 issues or sends a control signal 122 to memory controller 112 directing the memory controller to cause memory 114 to enter a self-refresh mode. In particular, for DDR SDRAM memory devices operating according to the JEDEC standard JESD79-2A, the control signal 122 may direct the memory controller 112 to cause a clock enable (CKE) signal 124 to change from a high to a low logic state, which memory 114 recognizes as a signaling sequence to enter a self-refresh mode. Moreover, clock signals CK, $\overline{CK}$ 126 are not needed by memory 114 when in a self-refresh state. These clock signals 126 emanate from a memory clocking circuit 128 within the memory controller 112 and are delivered to memory 114 via the interface 116 and an inner connection 130 between the memory controller 112 and the interface 116. Because the clock signals 126 are no longer needed by memory 114, the memory controller 112 typically is configured to disable the memory clocking circuit 128 when memory 114 is in self-refresh. Because the memory clocking circuits 128 are typically comprised of CMOS switching, whose power consumption is directly related to the amount of switching, power saving is achieved by disabling the clocking circuitry. It is noted that, in addition to turning off clocks being driven by the memory controller 112 to the memory 114, further power reduction can be achieved by also turning off clocking branches within the memory controller 112.

Typically, within display controllers, such as display controller 102, a line buffer, such as line buffer 132 as shown in FIG. 1, are included to buffer or store entries read out of memory 114 by the memory controller 112 and the interface 134 between memory controller 112 and display controller 102, for display by the controller 102 on the display media 104, such as a monitor, CRT, or even a printer. The line buffer 132 is, for example, a first in first out (FIFO) buffer that allows the display controller 102, as a real time memory client, to fetch image data from memory 114 in advance. The buffer 132 stores a number of lines of image data, the number being dependent on the desired resolution of image data displayed on display media 104.

In the apparatus of FIG. 1, the control logic 118 is also configured to detect the storage level of the line buffer 132 via a connection 136 polling a register, for example, that contains bit information representing the current fill level of image data and the buffer 132. The logic 118 is configured to detect, after detection of a static image condition by logic 106, when the level of line buffer 132 is above or exceeds a first predetermined level 138. As an example, this first predetermined level or "watermark" could be set at four hundred (400) FIFO entries in the buffer 132.

If the first predetermined level has been exceeded, the control logic will issue the first control signal 122 directing the memory controller 112 to place memory 114 in self-refresh mode during a static screen condition. By ensuring that the line buffer has some minimal amount of entries stored, the memory 114 can be placed into self-refresh mode without danger or concern that the high latency of subsequent memory requests, which will suffer from the added latency of bringing the memory 114 out of self-refresh, will cause an underflow condition in the line buffer 132. That is, the buffer 132 will have enough entries stored to "ride out" the latency period without running out of data, which would result in visible image corruption on the display media 222.

While entries are read out of the line buffer 132 for display, the control logic 118 continues to monitor the level of line buffer 132. When the level of line buffer 132 drops below a second predetermined level 140, the control logic 118 issues a second control signal 142 to memory controller 112 to direct the memory controller 112 to bring memory 114 out of the self-refresh mode. The second predetermined level 140 is selected to ensure that a sufficient number of entries still exist in the line buffer 132 to ensure no degradation in the displayed image data during the latency period required to bring the memory 114 out of self-refresh mode. As an example, a watermark could be set for the second predetermined level 140 at one hundred (100) FIFO entries in the buffer 132.

Once the memory 114 is again active for memory accesses from an image data bank 144, the display controller 102 reads image data from memory 114 into the line buffer 132. Again, if the static image detection logic 106 continues to detect a static screen condition, the control logic 118 continues to monitor the level of line buffer 132 as entries are being stored therein. When the first predetermined level 138 has been exceeded, the control logic 118 once again will issue the first control signal 122 to the memory controller 112 and the memory 114 is then returned to self-refresh mode.

If the graphics engine 108 or other memory clients access the image data within memory 114 during the above-operation of apparatus 100, the status image detection logic 106 is further configured to send an interrupt signal to control logic 118 via the connection 120 communicating that the memory 114 must be brought back from self-refresh mode, the control logic 118, in turn, immediately issues the second control signal 142 to the memory controller 112 directing controller 112 to bring memory 114 out of self-refresh.

It will be apparent to those skilled in the art that the use of a static image detection logic 106 and responsive control logic 118 to control the memory controller 112 to put a memory device in self-refresh mode, as well as disabling memory clocking circuits 128 achieves reduction in power consumption during periods when the displayed image is not changing and the need for active memory reads and writes is not critical. Moreover, the disclosed apparatus 100 achieves a greater reduction in power over the prior art procedures of placing a memory, such as memory 114, in a pre-charge power down condition during static screen conditions because the memory clocking circuits 128 can be disabled during self-refresh, whereas the clock signals are still necessary during pre-charged power down modes of memory 114.

Figure 2:
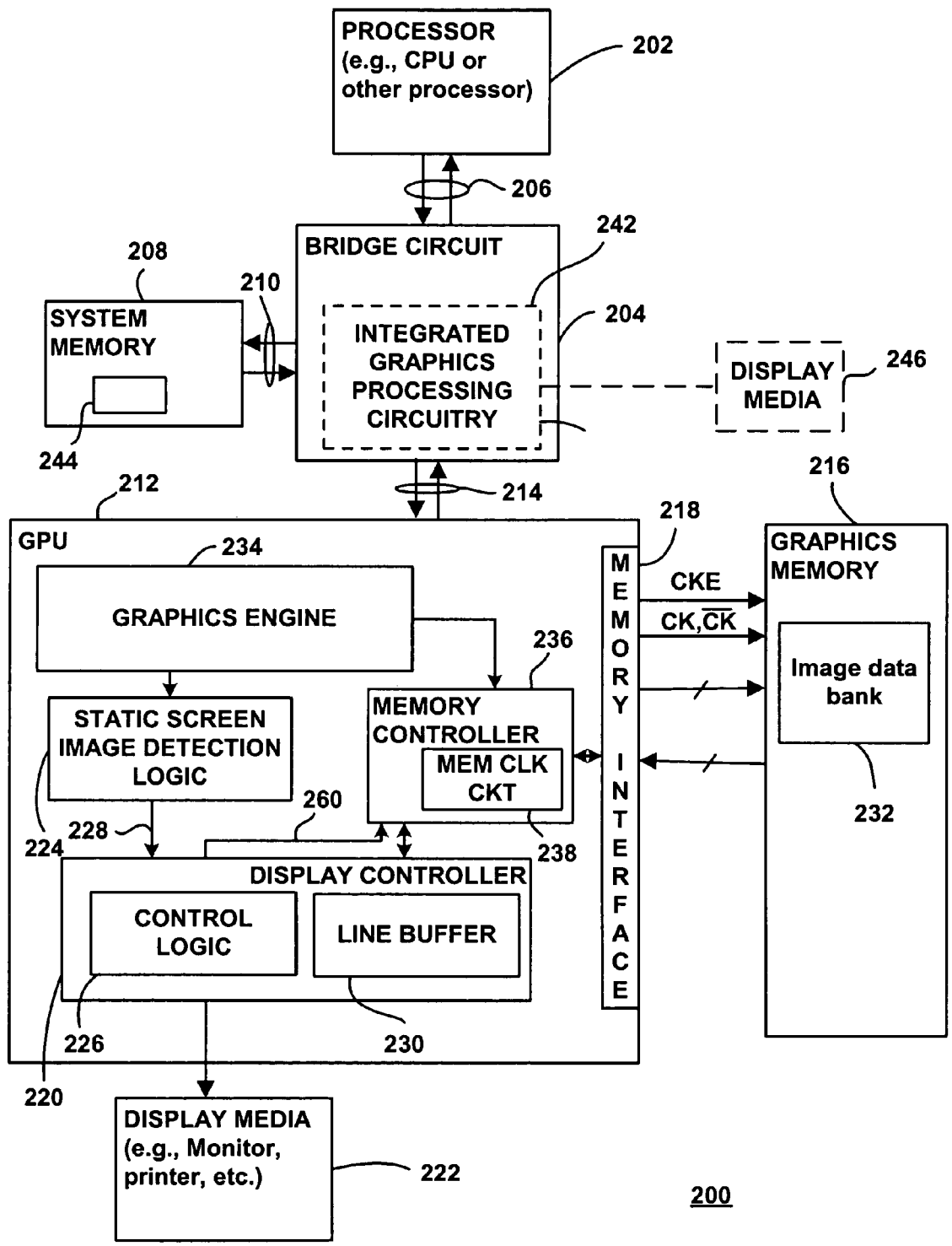
FIG. 2 illustrates an example of an architecture for a computing system utilizing an apparatus for controlling a memory controller in accordance with the present disclosure.

FIG. 2 illustrates an example of a particular implementation of the apparatus of FIG. 1 in a computing system 200. The system 200 includes a processor 202 such as a central processing unit (CPU) or other similar processor, and a bridge circuit 204, such as a "Northbridge," connected to the processor 200 via a front bus 206 or other similar interface. The system 200 also includes a system memory 208 connected to the bridge circuit 204 via an interface 210 operating according to an interconnect standard such as PCI Express, PCI or AGP.

System 200 also includes a discrete graphics processing unit (GPU) 212, which includes graphics processing circuitry, connected to the bridge circuit 204 via an interface 214, also operable according to interface standards such as PCI Express, PCI or AGP. The discrete graphics processing unit 212 is interfaced with a dedicated graphics memory 216 via a memory interface 218. The graphics processing unit 212 includes a display controller 220 similar to display controller 102 in FIG. 1 that drives display media 222, such as monitors, CRTs or printers, as examples. Static screen mode detection logic 224 is included within the graphics processing unit 212 and is similar to logic 106 in FIG. 1. Further, display controller 220 may include control logic 226, similar to control logic 118 in FIG. 1 that is responsive to the logic 224 via a connection 228. Although control logic 226 is illustrated within the display controller, it may be separate in the alternative. The display controller 220 also includes a line buffer 230 for buffering or storing line entries read from an image data bank 232 within the graphics memory 216. The GPU 212 also includes a graphics engine 234 or other similar memory client and a memory controller 236 including memory clocking circuits 238.

In operation, logic 224 and 226 operate in the manner discussed previously with respect to FIG. 1 where control logic 226 issues control signals to memory controller 236 via a connection 240, for example, in order to effect control of the controller 236 to place the memory 216 in any self-refresh mode during static screen conditions and when line entries are buffered with the buffer 230.

It is further noted that the system 200 may also include integrated graphics processing circuitry 242 within the bridge circuit 204. This circuitry 242 may include the components of the discrete graphics processing unit 212 including static screen mode detection logic 224 and control logic 226 in order to effect control of a memory controller, also within circuitry 242 in order to reduce power consumption. In the case of integrated graphics circuitry 242 within the bridge circuit 204 the system memory 208 would store display image data in an image data 244, for example, and the access via the interface 210. Additionally, a display media 246 is driven directly by the circuitry 242 on the bridge circuit 204. It is further noted that in the case of integrated graphics processing circuitry, detection by static screen mode detection logic 224 of a static condition may, in addition to detecting the condition of a graphics engine or accesses by memory clients within the memory controller, may detect a "C3" condition on the front side bus 206. A C3 condition is known in the art as a CPU power state where the front side bus 206 is idle, thus indicating that new GPU commands are not being submitted to the graphics engine, which in turn indicates a high probability of the existence of a static screen state.

Figure 3:
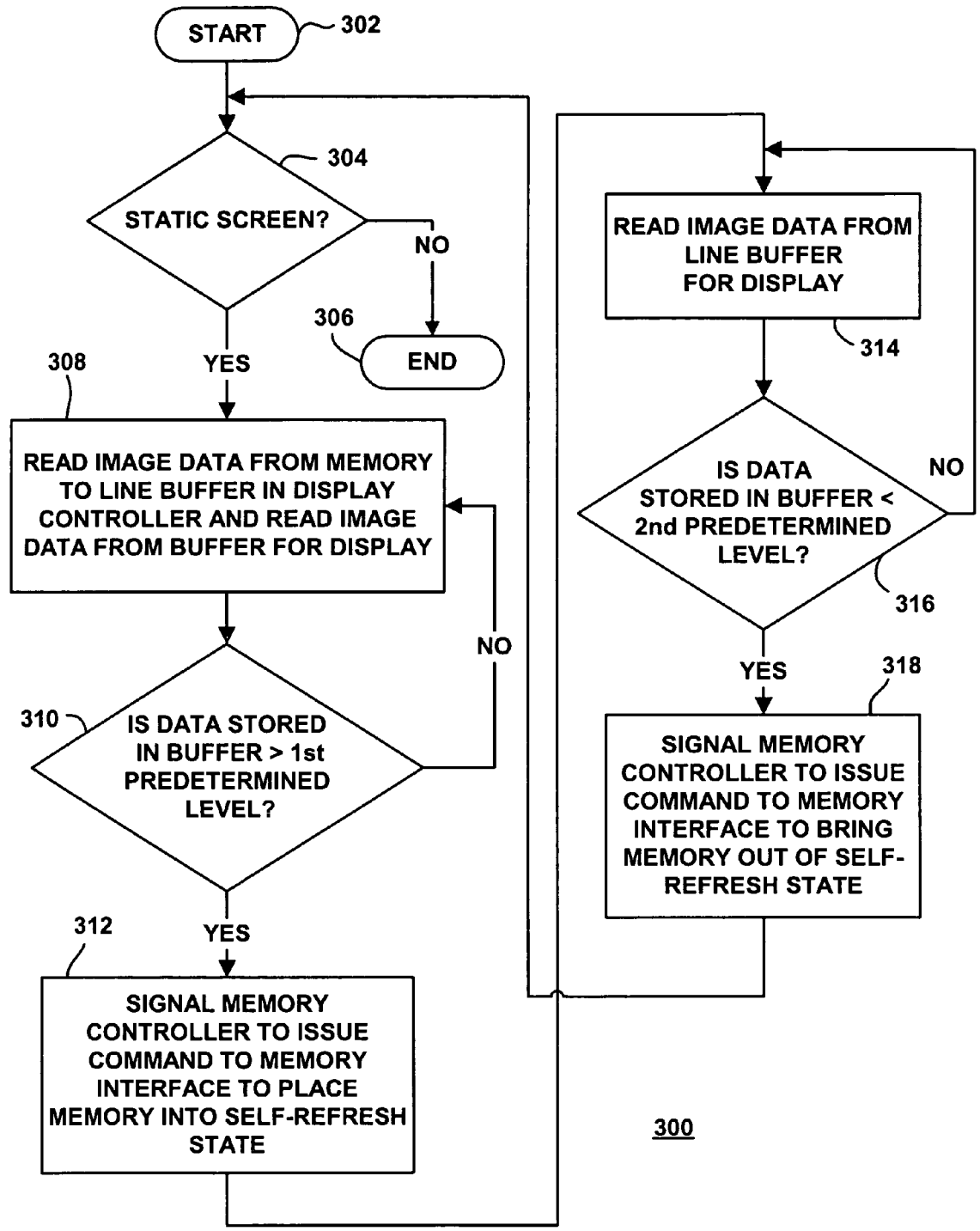
FIG. 3 illustrates a flow diagram of a method for controlling a memory during a static screen condition in accordance with the present disclosure.

FIG. 3 illustrates a flow diagram of a process that may be performed by the apparatus in FIGS. 1 and 2 for control of a memory controller. The process 300 illustrated in FIG. 3 starts at block 302 and proceeds to decision block 304 where a static screen condition is detected. This detection may be effected by the static screen detection logic 106 or 224, as examples. When a static screen condition is not found in block 304, flow simply proceeds to block 306 where the process ends.

Alternatively, if a static screen condition is detected at block 304, flow proceeds to block 308 where image data is read from memory to the line buffer in the display controller. Additionally, image data is, in turn, read from the buffer for display on the display media during each refresh cycle of the display media. Display controller 102 and line buffer 132 in FIG. 1, as an example, may accomplish the process of block 308. Flow then proceeds to decision block 310 where a determination is made whether the data stored in the line buffer is greater than a first predetermined level. This determination may be made, for example, by control logic 118 illustrated in FIG. 1. If the data is not above the first predetermined level, flow proceeds back to block 308 where the display controller 102 or 220 continues to read image data from the memory to the line buffer.

Once the data in the line buffer exceeds the first predetermined level, as determined at block 310, flow proceeds to block 312 where the memory controller is signaled to issue a command to the memory interface to place the memory into a self-refresh state. As discussed previously, this process is performed by the control logic 118 issuing a first control signal 122 to memory controller 112, which, in turn, signals the memory 114 to enter self-refresh mode. Once, the memory is in self-refresh, flow proceeds to block 314, where image data continues to be read from the line buffer for display.

As image data continues to be read out of the line buffer as indicated in block 314, the control logic (e.g., control logic 118) continues to monitor and determine whether the data stored in the line buffer falls below the second predetermined level as indicated in decision block 316. If the buffer level has not fallen below the second predetermined level, flow proceeds back to block 314 where image data continues to be read from the line buffer for display on the display media. When the control logic determines that the image data in the line buffer has fallen below the second predetermined level, flow proceeds then to block 318 where the memory controller is signaled to issue a command to memory interface to bring the memory out of the self-refresh state. This process is carried out, for example, by the control logic 118 issuing the second control signal 142 to the memory controller 112, as illustrated in FIG. 1 and described previously.

After completion of the process in block 318, flow then proceeds to decision block 304, where the procedure starts over. It is noted that although the process 300 shows only one time period in the process for detecting a static screen condition, namely block 304, it is noted that the static screen image detection logic 106 or 224 continuously monitors whether a graphics engine or some other memory client is accessing the memory, thereby indicating termination of a static screen condition. In this event, the static screen image detection logic may issue an interrupt whereby the control logic is signaled to immediately issue the second control signal 142 to the memory controller 112 in order to initiate bringing the memory out of self-refresh mode, if memory is currently in that mode.

In light of the forgoing described apparatus and methods, one of ordinary skill in the art will appreciate that by controlling a memory controller in order to actively or dynamically command the controller to place a memory in a self-refresh mode, an increased power savings is achieved by reduced power of utilizing a self-refresh mode compared to merely utilizing a pre-charge power down mode. Additionally, by using self-refresh mode, further power savings is affording through the ability to disable memory clocking circuits in the memory controller. It is further noted that although the presently disclosed apparatus and methods have been described in the context of display image data, it is conceivable that the disclosed methods and apparatus may be applied to any memory control where static stored data is being continuously utilized for reducing power consumption.

The above-detailed described of the examples has been presented for the purposes of illustration and description only and not by limitation. It is therefore contemplated that the present application cover any additional modifications, variations, or equivalence that fall with in the spirit and scope of the basic underlying principles disclosed above and the appended claims.

What is claimed is:

1. An apparatus for controlling a memory controller comprising:
   static image detection logic configured to detect when image data being displayed by a display controller is static; and
   control logic responsive to the communicated detection of static image data from the static image detection logic, the control logic configured to send a first control signal to a memory controller directing the memory controller to cause a memory storing the static image data to enter a self-refresh mode and to turn off at least one memory clocking circuit within the memory controller while said memory is in said self-refresh mode, wherein the control logic is further configured to detect when a level of a line buffer in the display controller storing image data read from the memory exceeds a first predetermined level and to send the first control signal to the memory controller when the first predetermined level is exceeded.

2. The apparatus as defined in claim 1, wherein the static image detection logic is further configured to determine when the image data is accessed by an application and to send an interrupt to the control logic after such determination, and the control logic is configured to send a second control signal to the memory controller to bring the memory out of the self-refresh mode after receiving the interrupt.

3. The apparatus as defined in claim 1, wherein the apparatus is contained within one of a discrete graphics processing unit or an integrated graphics processing unit.

4. The apparatus as defined in claim 1, wherein the memory is a double data rate synchronous dynamic random access memory (DDR SDRAM).

5. An apparatus for controlling a memory controller comprising:
   static image detection logic configured to detect when image data being displayed by a display controller is static; and
   control logic responsive to the communicated detection of static image data from the static image detection logic, the control logic configured to send a first control signal to a memory controller directing the memory controller to cause a memory storing the static image data to enter a self-refresh mode and to turn off at least one memory clocking circuit within the memory controller while said memory is in said self-refresh mode, wherein the control logic is further configured to detect when the line buffer level falls below a second predetermined level and then send a second control signal to the memory controller to bring the memory out of the self-refresh mode until the level of the line buffer exceeds the first predetermined level, at which time the control logic sends the first control signal to the memory controller to return the memory to the self refresh mode.

6. A method for controlling a memory controller comprising:
   detecting a static condition of image data being displayed by a display controller;
   sending a first control signal to a memory controller directing the memory controller to cause a memory storing the static image data to enter a self-refresh mode and to turn off at least one memory clocking circuit within the memory controller in response to detecting the static condition while said memory is in said self-refresh mode;
   detecting when the line buffer level falls below a second predetermined level;
   signaling the memory controller to bring the memory out of the self-refresh mode and reading image data until the level of the line buffer exceeds the first predetermined level; and
   signaling the memory controller to return the memory to self refresh when the level of the line buffer reaches the first predetermined level.

7. The method as defined in claim 6, further comprising:
   determining when the image data is accessed by an application;
   sending an interrupt the control logic after such determination; and
   signaling the memory controller to bring the memory out of the self-refresh mode after receiving the interrupt.

8. The method as defined in claim 6, wherein the memory is a double data rate synchronous dynamic random access memory (DDR SDRAM).

9. A graphics processing circuitry comprising:
a memory controller configured to control reading and writing of data to a memory over a memory interface, the memory controller including at least one memory clock circuit for control of the memory;
a display controller configured to read display image data from the memory via the memory controller and to display the read display image data on a display medium;
static image detection logic configured to detect when image data being displayed by the display controller is static and to communicate detection of static image data to the display controller; and
control logic responsive to the static image detection logic, the control logic configured to send a signal to the memory controller directing the memory controller to cause the memory to enter a self-refresh mode, thereby turning off the at least one memory clock circuit within the memory controller while said memory is in said self-refresh mode, wherein the control logic is further configured to detect when a level of a line buffer in the display controller storing image data read from the memory exceeds a first predetermined level and to send the first control signal to the memory controller when the first predetermined level is exceeded.

10. A graphics processing circuitry comprising:
a memory controller configured to control reading and writing of data to a memory over a memory interface, the memory controller including at least one memory clock circuit for control of the memory;
a display controller configured to read display image data from the memory via the memory controller and to display the read display image data on a display medium;
static image detection logic configured to detect when image data being displayed by the display controller is static and to communicate detection of static image data to the display controller; and
control logic responsive to the static image detection logic, the control logic configured to send a signal to the memory controller directing the memory controller to cause the memory to enter a self-refresh mode, thereby turning off the at least one memory clock circuit within the memory controller while said memory is in said self-refresh mode, wherein the control logic is further configured to:
determine when the line buffer level falls below a second predetermined level; and
signal the memory controller to bring the memory out of the self-refresh mode when the line buffer level is determined to have fallen below the second predetermined level until the level of the line buffer reaches the first predetermined level, at which time the control logic directs the memory controller to return the memory to the self refresh mode.

11. The graphics processing circuitry as defined in claim 9, wherein the static image detection logic is further configured to determine when the image data is accessed by an application and to send an interrupt to the control logic after such determination, and the control logic is configured to signal the memory controller to bring the memory out of the self-refresh mode after receiving the interrupt.

12. The graphics processing circuitry as defined in claim 9, wherein the graphics processing circuitry is contained within a discrete graphics processing unit.

13. The graphics processing circuitry as defined in claim 9, wherein the graphics processing circuitry is contained within an integrated graphics processing unit within a bridge circuit.

14. The graphics processing circuitry as defined in claim 9, wherein the memory is a double data rate synchronous dynamic random access memory (DDR SDRAM).

15. A method for controlling a memory controller comprising:
detecting a static condition of image data being displayed by a display controller;
sending a first control signal to a memory controller directing the memory controller to cause a memory storing the static image data to enter a self-refresh mode and to turn off at least one memory clocking circuit within the memory controller in response to detecting the static condition while said memory is in said self-refresh mode, wherein sending the first control signal to the memory controller comprises:
detecting a level of a line buffer in the display controller that stores the display image data; and sending the first control signal to a memory controller when the level of the line buffer exceeds a first predetermined level.

* * * * *